(12) United States Patent
Kisiler et al.

(10) Patent No.: US 8,317,059 B2
(45) Date of Patent: Nov. 27, 2012

(54) ADJUSTABLE FUEL TANK FOR A VEHICLE

(75) Inventors: Mark Kisiler, Torrance, CA (US);
David A. Thompson, Bellefontaine, OH (US)

(73) Assignee: Honda Motor Co., Ltd., Tokyo (JP)

( * ) Notice: Subject to any disclaimer, the term of this patent is extended or adjusted under 35 U.S.C. 154(b) by 234 days.

(21) Appl. No.: 12/700,982

(22) Filed: Feb. 5, 2010

(65) Prior Publication Data
US 2011/0192858 A1   Aug. 11, 2011

(51) Int. Cl.
*A47G 19/22* (2006.01)
*B65D 88/12* (2006.01)

(52) U.S. Cl. ...... 220/720; 220/4.12; 220/4.14; 220/562; 220/905

(58) Field of Classification Search ............ 220/4.12, 220/4.14, 564, 720, 905, 4.13, 562
See application file for complete search history.

(56) References Cited

U.S. PATENT DOCUMENTS

| | | | |
|---|---|---|---|
| 2,432,025 A * | 12/1947 | Lorenz ............... | 137/590 |
| 3,648,886 A | 3/1972 | Pringle | |
| 3,917,117 A | 11/1975 | Plotsky | |
| 4,337,842 A * | 7/1982 | Spangler et al. ....... | 180/302 |
| 5,310,080 A | 5/1994 | Figge, Sr. | |
| 5,447,110 A | 9/1995 | Brown | |
| 5,526,795 A | 6/1996 | Thompson et al. | |
| 5,862,940 A | 1/1999 | Chism et al. | |
| 6,036,046 A | 3/2000 | Brambach | |
| 6,047,848 A | 4/2000 | Davis | |
| 6,457,433 B1 | 10/2002 | Nagata | |
| 7,118,436 B2 | 10/2006 | Montgomery | |

FOREIGN PATENT DOCUMENTS

| JP | 01240388 | 9/1989 |
|---|---|---|
| JP | 2000085381 | 3/2000 |

* cited by examiner

*Primary Examiner* — Harry Grosso
(74) *Attorney, Agent, or Firm* — Rankin Hill & Clark LLP

(57) ABSTRACT

An adjustable fuel tank for a vehicle includes a container body having a first container section and second container section. A container volume is defined by the container body. The first and second container sections are moveable relative to one another for adjusting at least one of an exterior shape of the container body and the container volume of the container body.

14 Claims, 7 Drawing Sheets

ADJUSTABLE FUEL TANK FOR A VEHICLE

BACKGROUND

Exemplary embodiments herein generally relate to vehicles and components for vehicles and, more particularly, to a fuel tank for a vehicle.

A conventional fuel tank on a vehicle includes a container of fixed volume and geometry. By way of example, FIG. 1 illustrates a conventional fuel tank 10 having a fixed volume and geometry. In particular, the fuel tank 10 includes a container body 12 formed of a rigid material, such as hard plastic or steel. A container volume is defined by the interior of the container body for holding fuel for a vehicle, particularly for the internal combustion engine of the vehicle. As is known, the container body 12 can include a first aperture 14 and a second aperture 16, both defined along an upper wall or portion 18 of the container body. The first aperture 14 can be configured to receive fuel, such as when filling the container volume and to pass fuel, such as when operating the vehicle (i.e., supplying fuel to the internal combustion engine). The second aperture 16 can be configured to vent the holding volume such as during refilling thereof or to admit air or fuel vapors, such as when fuel is depleted from the container volume.

A typical fuel tank, such as the fuel tank 10 of FIG. 1, does not offer flexibility to increase or decrease fuel volume, such as based on customer need for driving range requirements, or overall size and shape, such as to accommodate the vehicle geometry (i.e., particular vehicle layouts). For example, vehicle manufacturers presently employ many varieties of fuel tanks having various configurations, such configurations often corresponding to the type of vehicle (e.g., a small fuel efficient vehicle or a larger sport utility vehicle) and being tailored to particular vehicle layout conditions. Representative fuel tanks used on current production vehicles, particularly passenger vehicles, are a tall/short saddle-type fuel tank used on the Acura RDX, a low/long saddle-type fuel tank used on BMW's X3, a long asymmetrical tank used on Toyota's RAV4 (and also on Nissan's Frontier and Ford's Discovery), an L-shaped saddle fuel tank used on Honda's CRV and Acura MDX, a waterfall L-shaped saddle used on Hyundai's Santa Fe and Porsche's Cayenne, and a low flat trapezoid fuel tank used on the Honda Fit, among others.

SUMMARY

In accordance with one aspect, an adjustable fuel tank for a vehicle includes a container body having a first container section and second container section. A container volume is defined by the container body. The first and second container sections are moveable relative to one another for adjusting at least one of an exterior shape of the container body and the container volume of the container body.

According to another aspect, a vehicle fuel tank having a variable geometry includes a fuel tank body having a first fuel tank section and a second fuel tank section. The first and second fuel tank sections are moveable apart from one another for varying an exterior shape and a holding volume of the fuel tank body.

According to still another aspect, a method of installing an adjustable fuel tank in a vehicle is provided. In the method, a fuel tank body having a first fuel tank section and a second fuel tank section is provided. The first and second fuel tank sections are moveable relative to one another to vary an exterior shape of the fuel body and a container volume of the fuel body. The second fuel tank section is moved relative to the first fuel tank section to adjust the exterior shape of the fuel tank body and the container volume of the fuel tank body. The fuel tank body is installed on the vehicle.

DETAILED DESCRIPTION

Figure 1:
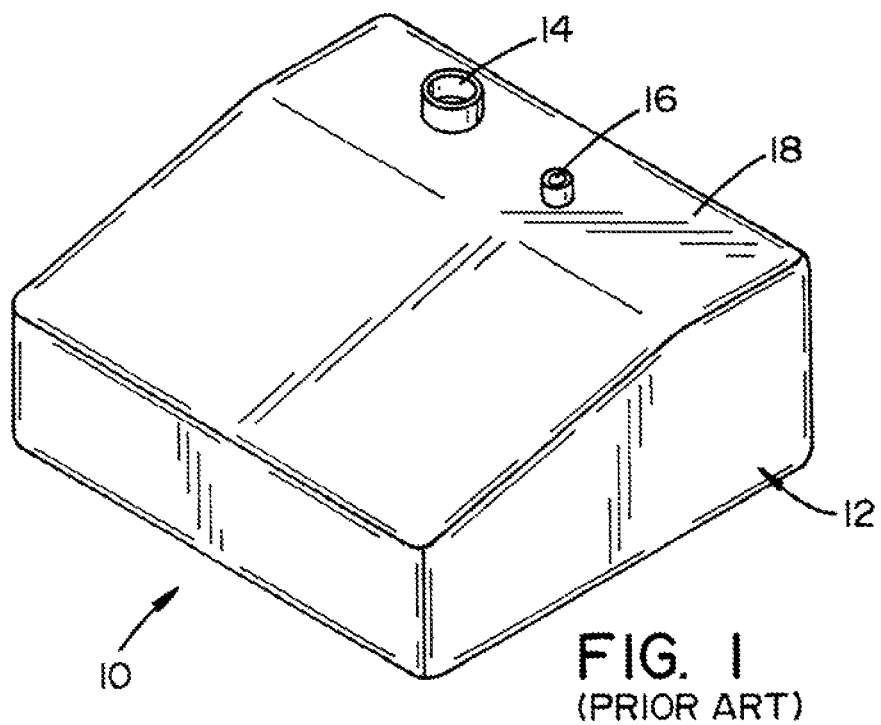
FIG. 1 is a perspective view of a prior art fuel tank for a vehicle having a fixed volume and geometry.
Figure 2:
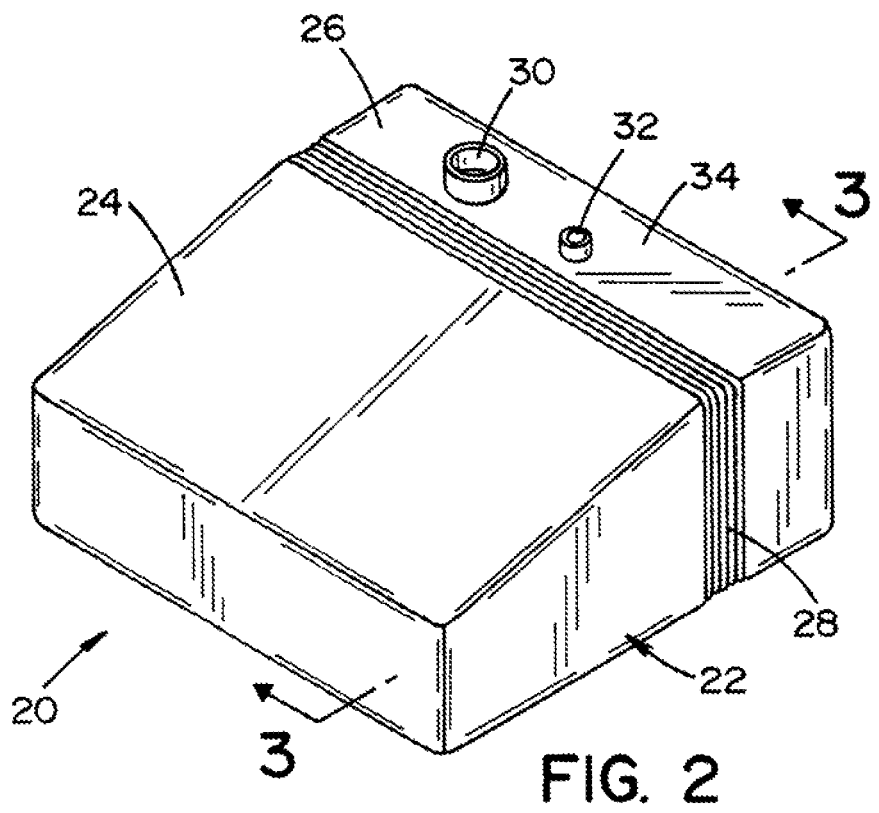
FIG. 2 is a perspective view of an adjustable fuel tank for a vehicle having a growth section for longitudinally increasing a size of the fuel tank.
Figure 3:
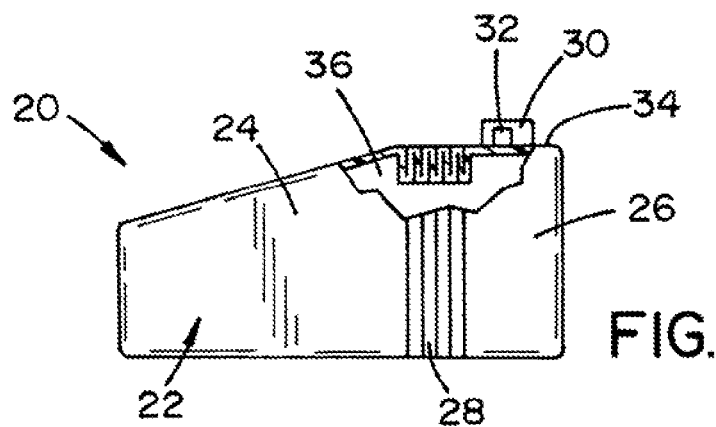
FIG. 3 is a partial cross-sectional view of the fuel tank taken along the line 3-3 of FIG. 2.
Figure 4:
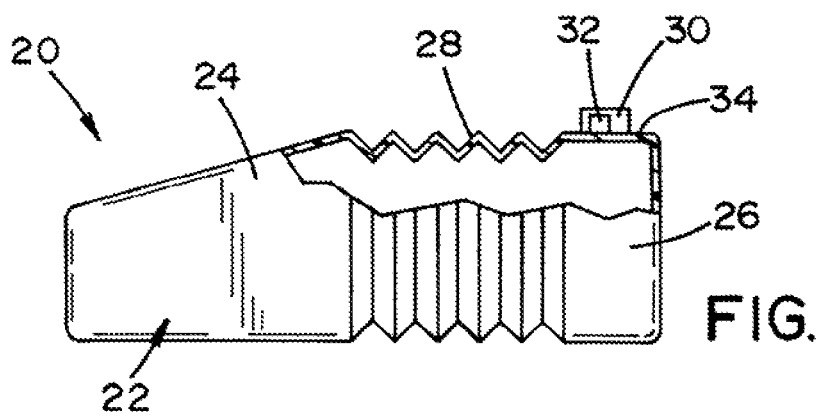
FIG. 4 is another partial cross-sectional view of the fuel tank of FIG. 2 shown in an expanded state.

Referring now to the drawings, wherein the showings are for purposes of illustrating one or more exemplary embodiments and not for purposes of limiting same, FIGS. 2-16 illustrate a variety of exemplary adjustable fuel tanks for vehicles, particularly of the type provided for holding fuel for an internal combustion engine. With particular reference to FIGS. 2-4, an adjustable fuel tank 20 includes a fuel tank or container body 22 having a first container or fuel tank section 24 and a second container or fuel tank section 26. The container body 22 defines a container volume within an interior chamber 36 of the container body 22. As will be described in more detail below, the first and second container sections 24, 26 are moveable relative to one another for adjusting at least one of an exterior shape of the container body 22 and the container volume of the container body 22.

In the embodiment illustrated in FIGS. 2-4, the container body 22 can further include an adjustable portion or growth zone 28 interconnecting the first and second container sections 24, 26. The adjustable portion 28 enables relative movement between the first and second container sections 24, 26. For example, through the adjustable portion 28, the first and second container sections 24, 26 are moveable apart from one another for varying an exterior shape of the container body 22 and a container or holding volume of the container body 22.

In the illustrated embodiment, the adjustable portion 28 is a bellows portion or an accordion-pleated adjustable portion connecting the first and second sections 24, 26 together. The adjustable portion 28 is expandable (FIG. 4) to enable the first and second sections 24, 26 to be moved apart from one another. In particular, the adjustable portion 28 is expandable and collapsible to adjust the exterior shape of the container body 22 and the container volume of the container body 22. In particular, the first and second container sections 24, 26 can be moved apart from one another (or moved toward one another) to change outer dimensions of the container body 22 and correspondingly change the container volume of the container body 22.

The depicted container body 22 also includes a first aperture 30 and a second aperture 32, both defined or provided in the second section 26 along an upper wall or portion 34 of the container body 22. As will be understood and appreciated by those skilled in the art, the first aperture 30 can be configured to receive fuel when filling the container volume of the container body 22 with fuel and to pass such fuel when operating the vehicle (e.g., supplying fuel to the internal combustion engine of the vehicle). The second aperture 32 can be configured to vent the container volume of the container body 22 when fuel is added thereto and can be configured to allow air or other vapor (e.g., gaseous vapor) to pass back into the container volume of the container body 22 when fuel is depleted from the container body 22 through the first aperture 30.

In the particular embodiment illustrated in FIGS. 2-4, the container body 22 can be oriented in the vehicle in which it is mounted such that the first container section 24 is positioned forward of the second container section 26 relative to a longitudinal length of the vehicle. Accordingly, the adjustable portion 28 is disposed between the first and second section 24, 26 in such a manner so as to allow expansion and contraction along a longitudinal length within a vehicle when the first section 24 is moved forwardly relative to the second section 26.

Figure 5:
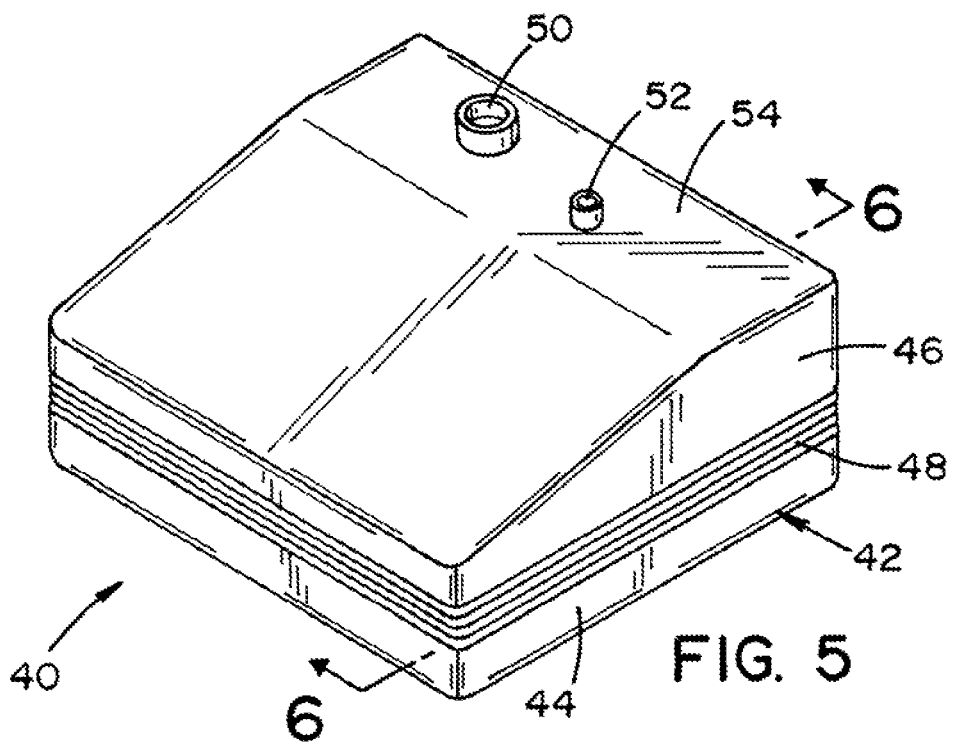
FIG. 5 is a perspective view of an adjustable fuel tank for a vehicle having an expansion zone that allows a height of the fuel tank to be adjusted.
Figure 6:
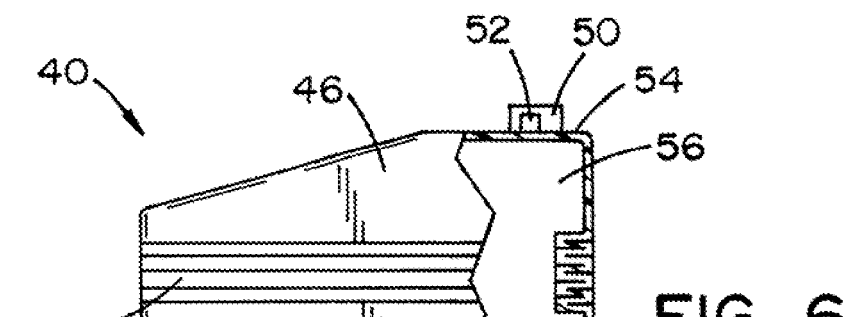
FIG. 6 is partial cross-sectional view of the fuel tank of FIG. 5 taken along the line 6-6.
Figure 7:
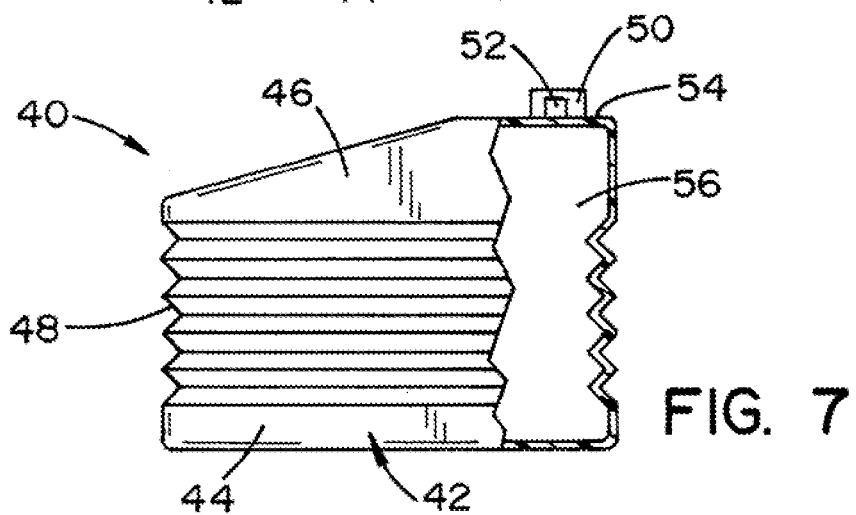
FIG. 7 is another partial cross-sectional view of the fuel tank of FIG. 5 shown in an expanded state.

With reference to FIGS. 5-7, another adjustable fuel tank 40 having a variable geometry for a vehicle is shown. Except as indicated herein, the adjustable fuel tank 40 can be like the fuel tank 20. For example, the fuel tank 40 can include a container body 42 having a first fuel tank or container section 44 and a second fuel tank or container section 46. A container volume is defined by the container body 44 (e.g., within an interior chamber 56 thereof). The first and second sections 44, 46 are moveable relative to one another (e.g., moveable apart from one another or moveable toward one another) for adjusting at least one of an exterior shape of the container body 42 and the container volume of that container body 42.

In the embodiment illustrated in FIGS. 5-7, the container body 42 further includes an adjustable portion 48 (e.g., an accordion pleated adjustable portion or bellows portion) that interconnects the first and second sections 44, 46 and enables relative movement therebetween. The container body 42 can be oriented in a vehicle in which it is mounted such that the first container section 44 is positioned below the second container section 46, particularly relative to a height of the vehicle. Accordingly, the adjustable portion 48 allows for the expansion and contraction of a height of the fuel tank 40 when so oriented in a vehicle. Like the fuel tank 20, the fuel tank 40 can also include a first aperture 50 and a second aperture 52, both disposed along an upper wall or portion 54 of the container body 42.

Figure 8:
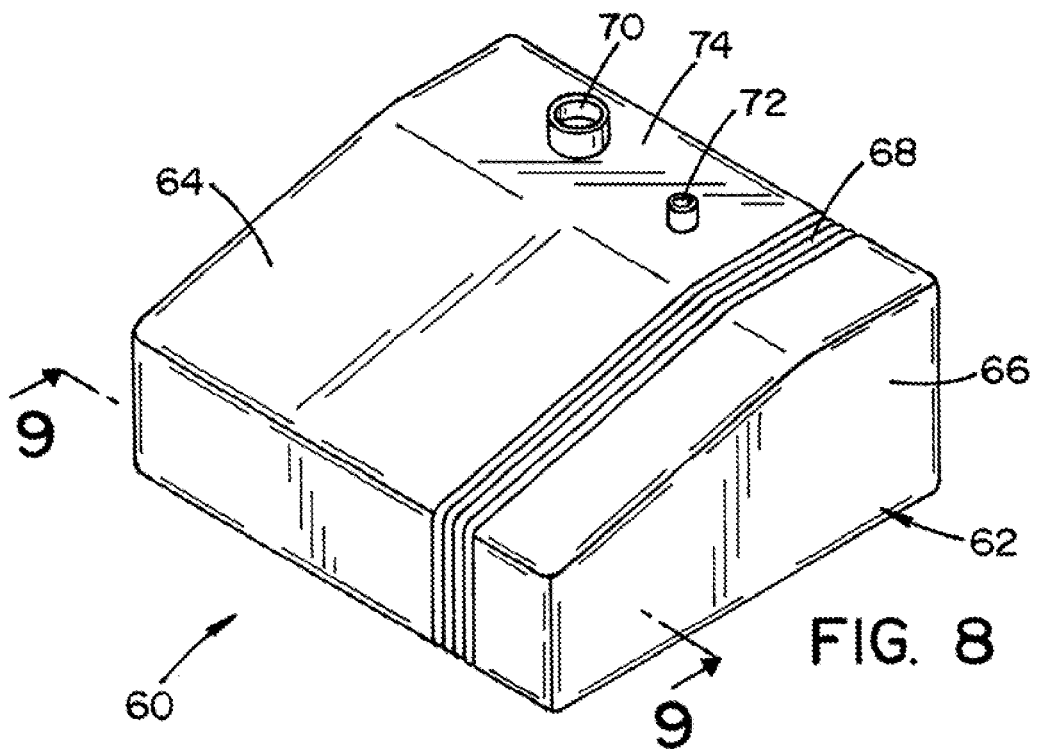
FIG. 8 is a perspective view of an adjustable fuel tank for a vehicle having a growth zone that allows the fuel tank to be expanded laterally.
Figure 9:
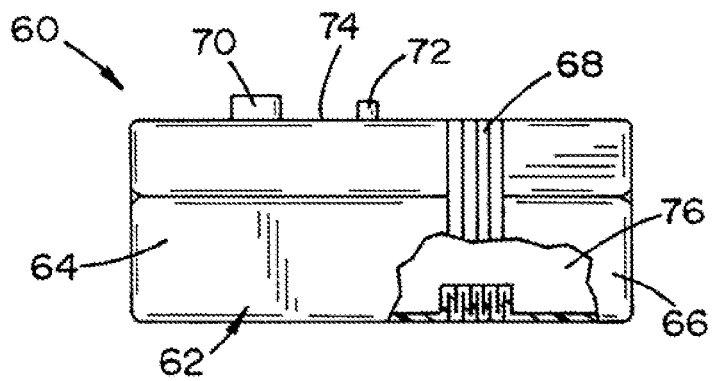
FIG. 9 is a partial cross-sectional view of the fuel tank of FIG. 8 taken along the line 9-9.
Figure 10:
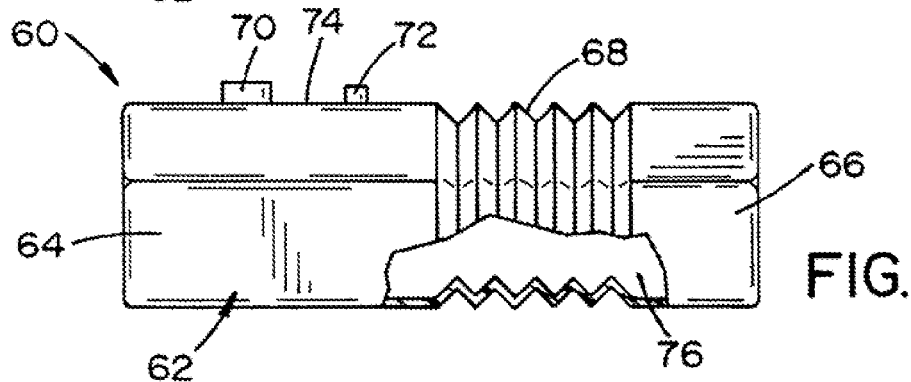
FIG. 10 is another partial cross-sectional view of the fuel tank of FIG. 8 shown in an expanded state.
Figure 11:
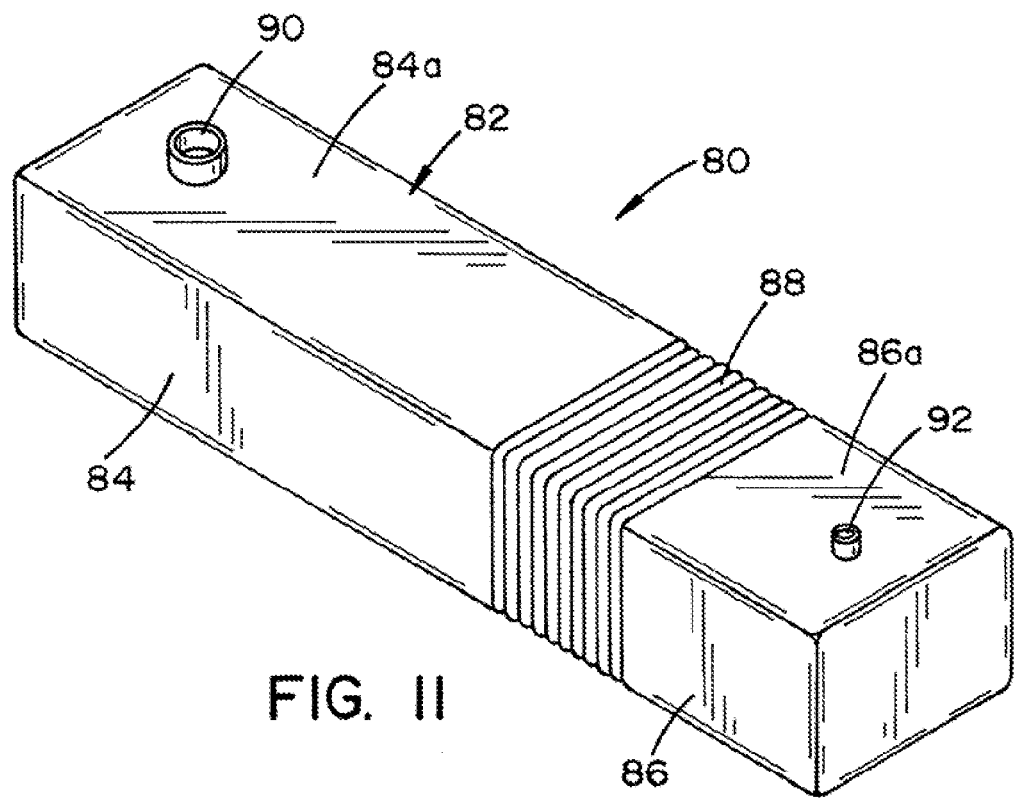
FIG. 11 is a perspective view of an elongated fuel tank having a growth zone allowing further elongation.

With reference to FIGS. 8-10, another adjustable fuel tank 60 having a variable geometry for a vehicle is shown. Except as indicated herein, the adjustable fuel tank 60 can be like the fuel tanks 20 and 40 described hereinabove. For example, the fuel tank 60 can include a container or fuel tank body 62 having a first container section 64 and a second container section 66. A container volume is defined by the container body 62, particularly by an interior chamber 76 (FIGS. 9 and 10) of the container body 62. The container body 62 can include an adjustable portion 68 that interconnects the first and second sections 64, 66 and enables relative movement therebetween.

As shown, the adjustable portion 68 can be a bellows portion or an accordion pleated adjustable portion that is expandable and collapsible to adjust the exterior shape of the container body 62 and the container volume of the container body 62. The positioning of the adjustable portion 68 laterally between the first section 64 and the second section 66 allows the container body 62 to be positioned in a vehicle such that the first container section 64 is laterally adjacent the second container section 66 relative to a lateral width of the vehicle. By this arrangement, lateral expansion and/or contraction of the fuel tank 60 is enabled. Like the fuel tanks 20, 40, the fuel tank 60 can further include a first aperture 70, and a second aperture 72, both positioned, in the illustrated embodiment, along an upper wall or portion 74.

With reference to FIGS. 11-14, still another adjustable fuel tank 80 having a variable geometry for a vehicle is shown. Except as indicated herein, the fuel tank 80 is like the fuel tanks 20, 40 and 60 described hereinabove. One difference in the fuel tank 80 is that its exterior shape is generally more elongated, but like the above-described fuel tanks the fuel tank 80 can include a container body 82 having a first container section 84 and a second container section 86. A container volume can be defined by the container body 82 (e.g., in an interior chamber).

Figure 12:
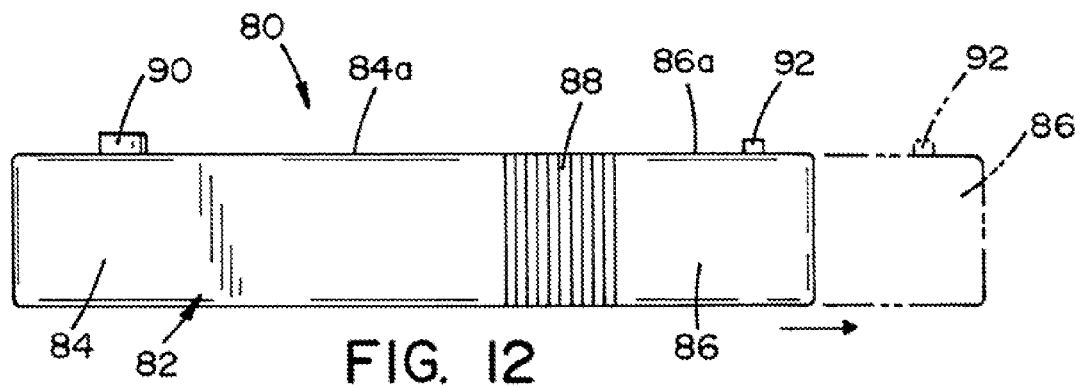
FIG. 12 is a side elevational view of the fuel tank of FIG. 11.
Figure 13:
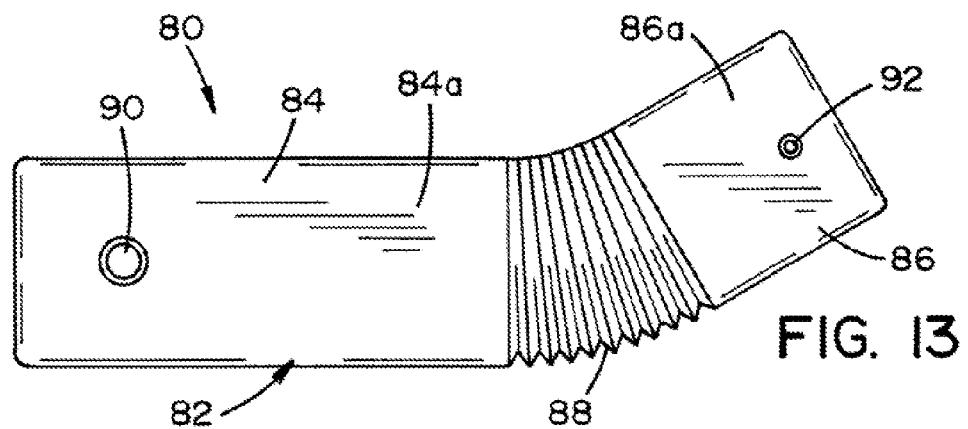
FIG. 13 is a plan view of the fuel tank of FIG. 11 shown with a second section pivotally moved relative to a first section via the growth zone.
Figure 14:
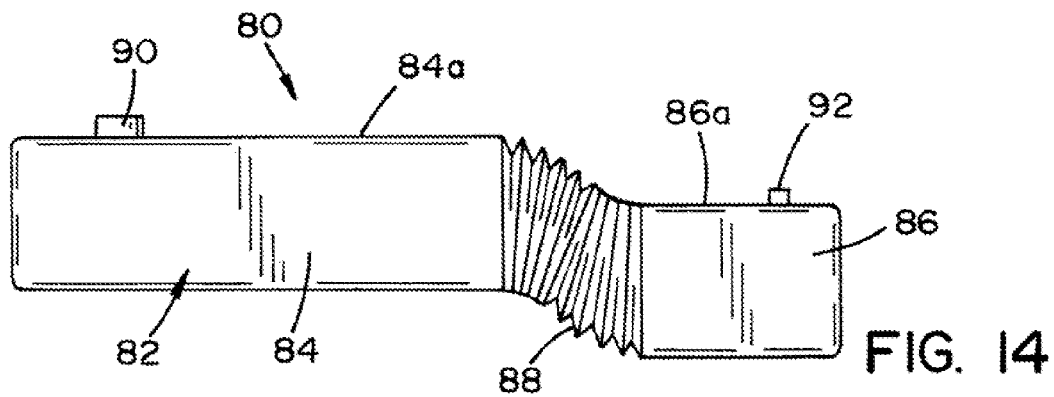
FIG. 14 is another side elevational view of the fuel tank of FIG. 11 shown with the second section lowered relative to the first section via the growth zone.

As shown in FIGS. 12-14, the first and second container sections 84, 86 are moveable relative to one another for adjusting an exterior shape of the container body 82 and the container volume of the container body 82. Like the fuel tanks 20, 40, 60, the fuel tank 80 includes an adjustable portion 88 interconnecting the first and second sections 84, 86 and enabling relative movement there between. As shown, however, the adjustable portion 88 of the fuel tank 80 is elongated relative to the adjustable portions 28, 48, 68 of the fuel tanks 20, 40, 60. As shown in FIG. 12, the elongated length of the fuel tank 80 can be increased simply by expanding the first and second sections 84, 86 apart from one another via the adjustable portion 88. Like the fuel tanks 20, 40, 60, the adjustable portion 80 can be a bellows portion or an accordion-pleated adjustable portion allowing expansion and contraction of the fuel tank 80 to adjust the exterior shape of the container body 82 and the container volume of the container body 82.

In addition, as shown in FIG. 13, the elongated adjustable portion 88 allows the first and second sections 84, 86 to be pivoted relative to one another. In FIG. 13, the second section 86 is shown in a pivoted or angularly positioned relative to the first section 84. While it is to be appreciated that some pivoting is allowed between respective sections in the fuel tanks 20, 40 and 60 via respective adjustable portions 28, 48, 68, the elongated size of the adjustable portion 88 allows more significant pivoting of the sections 84, 86 relative to one another. This enables the fuel tank 80 to be adapted to various vehicle layouts, where pivoting of the second section 86 relative to the first section 84 might be needed.

In FIG. 14, additional pivoting of the second section 86 relative to the first section 84 is shown. In particular, the second section 86 is shown being moveable in at least two directions relative to the first section 84. Specifically, the second section 86 is expanded apart from the first section 84 and is also lowered relative to the first section 84. Accordingly, an upper wall 86a of the second section 86 is dropped relative to an upper wall 84a of the first section 84. This allows the fuel tank 80 to be employed in further vehicle layouts without requiring a different fuel tank to be manufactured. Like the fuel tanks 20, 40, 60, the fuel tank 80 can include first and second apertures 90, 92, which on the fuel tank 80 are disposed on respective upper walls or portions 84a, 86a.

The container bodies for the adjustable fuel tanks depicted in FIGS. 2-14 can comprise a relatively rigid material (e.g., a metal or a hard plastic). In addition, the adjustable portions (or growth zones) of the adjustable fuel tanks depicted in FIGS. 2-14 can comprise a different, relatively flexible, material (e.g., rubber or a relatively soft plastic) from the material used to form the first and second container sections of the container bodies.

The container bodies of the adjustable fuel tanks depicted in FIGS. 2-14 could have uniform thickness (e.g., a similar wall thickness for the material in the adjustable portion compared to the first and second container sections). Alternatively, the thickness could vary (e.g., a reduced wall thickness for the material in the adjustable portion compared to the wall thickness in the container sections to promote flexibility in the adjustable portions).

Figure 15:
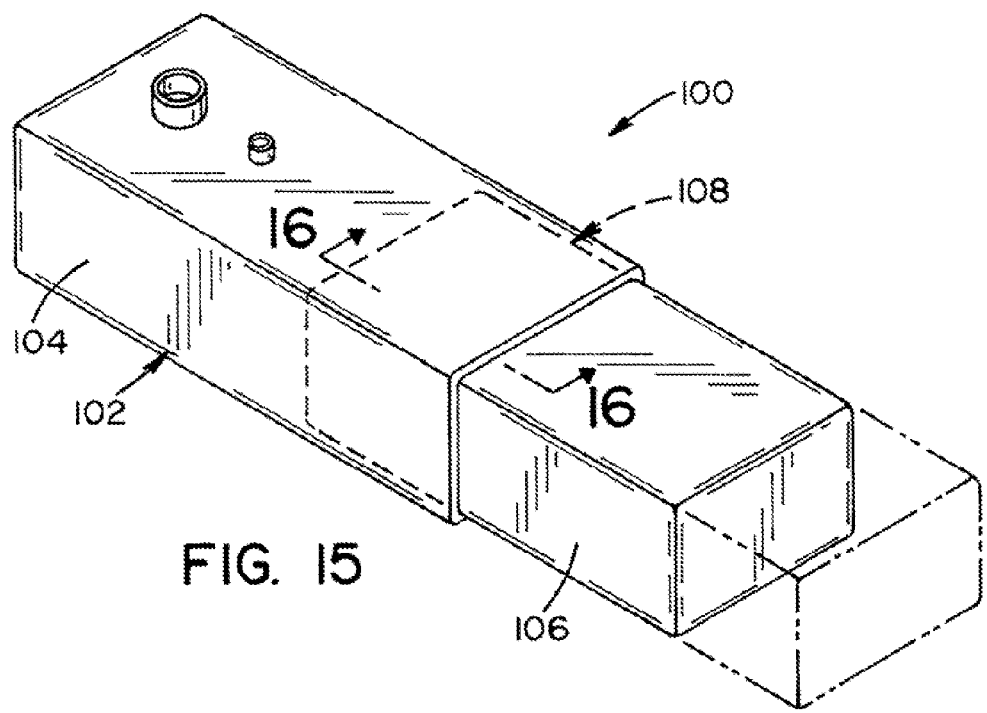
FIG. 15 is a prospective view of an adjustable fuel tank for a vehicle having first and second sections telescopingly received relative to one another.
Figure 16:
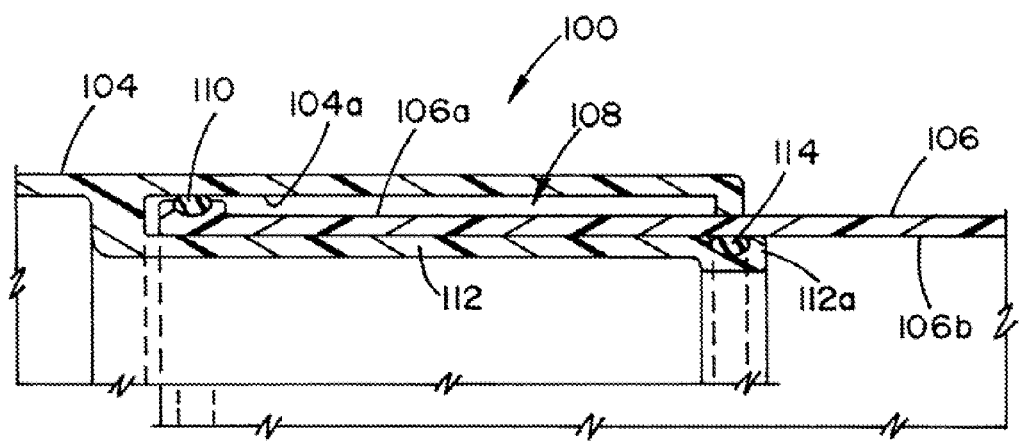
FIG. 16 is a partial cross-sectional view taken along the line 16-16 of FIG. 15.

With reference to FIGS. 15 and 16, still another adjustable fuel tank 100 for a vehicle is illustrated. The adjustable fuel tank 100 includes a container body 102 having a first container section 104 and a second section 106. A container volume is defined by the container body 102 (e.g., in an interior chamber). The first and second container sections 104, 106 are moveable relative to one another for adjusting at least one of an exterior shape of the container body 102 and the container volume of the container body 102.

As shown, the second container section 106 is telescopingly received in the first container section 104. By this arrangement, the first and second container sections 104, 106 are slideably moveable for varying the exterior shape and volume of the container body 102. That is, relative movement between the first and second sections 104, 106 occurs by telescopingly sliding one of the first or second sections relative to the other of the first and second sections 104, 106 to vary the exterior shape of the container body 102 and the container volume of the container body 102.

The fuel tank 100 can include a sealing arrangement 108 interposed between the first and second sections 104, 106 to prevent fuel leakage therebetween. In one exemplary embodiment, the sealing arrangement 108 can include a first seal 110 disposed between an inside surface 104a of the first section 104 and an exterior surface 106a of the second section 106. In addition, to provide redundant sealing action, a branch wall 112 can extend inwardly from the inner surface 104a for carrying another seal 114. The seal 114 being interposed between the branch wall 112, particularly a distal end 112a thereof, and an interior surface 106b of the second section 106. It is to be appreciated by those skilled in the art that the exact configuration of the sealing arrangement between the first container section 104 and the second container section 106 can vary from the illustrated embodiment. The first and second sections of the adjustable fuel tank 100 can be made from a relatively rigid material (e.g., a metal or a hard plastic) and the seal from a relatively flexible material (e.g., an elastomer) to facilitate sealing.

Figure 17:
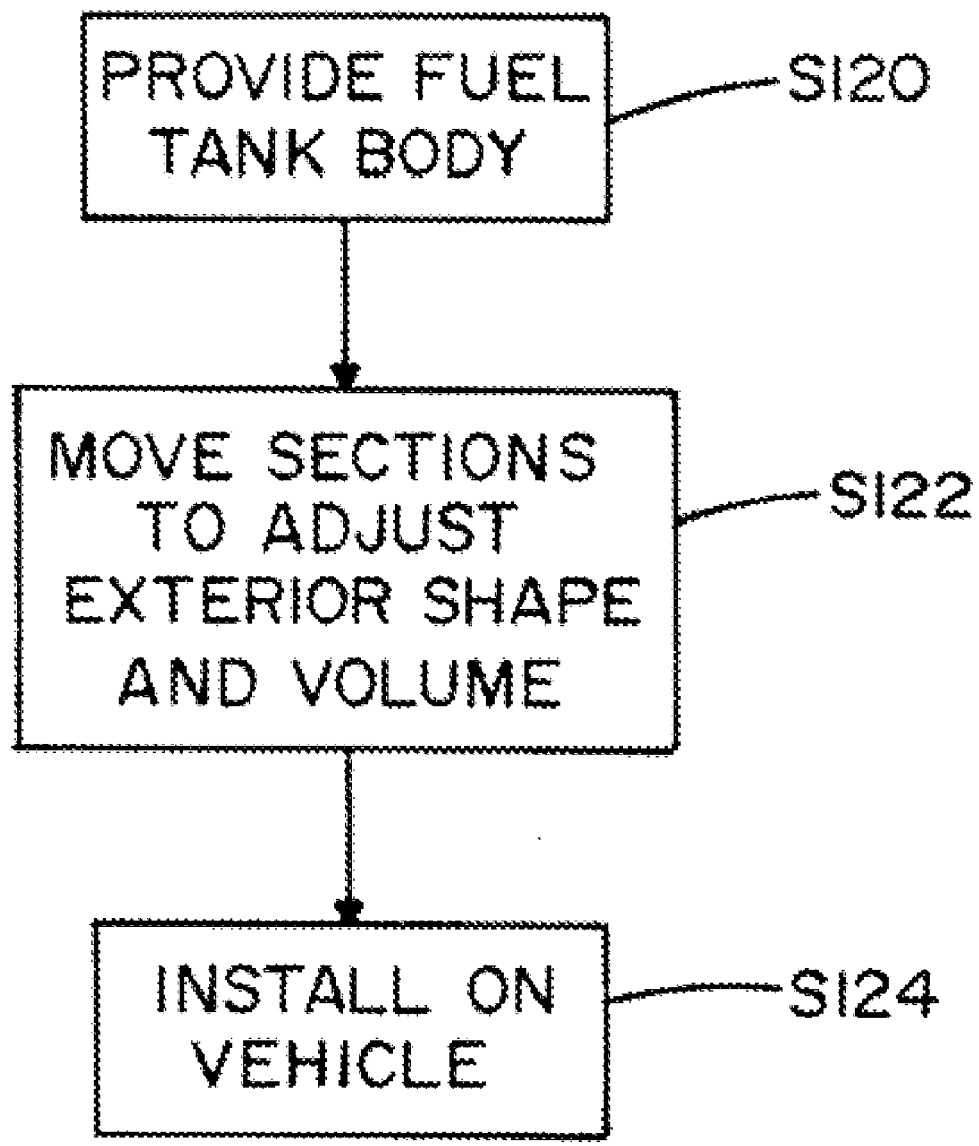
FIG. 17 is a process flow diagram showing a method of installing an adjustable fuel tank in a vehicle.

A method of installing an adjustable fuel tank, such as one of the fuel tanks 10, 20, 40, 60, 80 or 100, in a vehicle will now be described. In the method, with reference to FIG. 17, a fuel tank body having a first fuel tank section and the second fuel tank section is provided (S120). For example, fuel tank body 22 having first fuel tank section 24 and second fuel tank section 26 can be provided. As already described, the first and second fuel tank sections 24, 26 are moveable relative to one another to vary an exterior shape of the fuel tank body 22 and a container volume of the fuel tank body 22. Next, the second fuel tank section is moved relative to the first fuel tank section to adjust the exterior shape of the fuel tank body and the container volume of the fuel tank body (S122). Applied to the fuel tank 20, the second fuel tank section 26 is moved relative to the first fuel tank section 24 to adjust the exterior shape of the fuel tank body 22 and the container volume of the fuel tank body 22. After being appropriately configured, the fuel tank body is installed on the vehicle to which the fuel tank is to be mounted (S124). For example, the fuel tank body 22 can be installed on a vehicle.

As described hereinabove, the fuel tank body (e.g., fuel tank body 22) can include a bellows portion, such as bellows portion 28, and the second fuel tank section can be moved relative to the first fuel tank section by expanding the bellow portion (e.g., bellows portion 28). In alternate configurations, the second fuel tank section is telescopingly received in the first fuel tank section (e.g., the second section 106 is telescopingly received in the first fuel tank section 104 in FIGS. 15 and 16). In this arrangement, moving the second fuel tank section 106 includes slidably moving the second fuel tank section 106 relative to the first fuel tank section 104.

Depending on the orientation of the fuel tank in the vehicle and where an adjustable portion or sliding arrangement is provided between sections of the fuel tank, moving the second fuel tank section can include moving the second fuel tank section at least one of longitudinally, laterally or vertically on the vehicle relative to the first fuel tank section. For example, the fuel tank 20 can have its second section 26 moved longitudinally on the vehicle; the fuel tank 40 can have its second section 46 moved vertically on the vehicle; the fuel tank 60 can have its second section 66 moved laterally on the vehicle; etc. Still further, moving the second fuel tank section can include moving the second fuel tank section at least two of longitudinally, laterally or vertically on the vehicle relative to the first fuel tank section. For example, with reference to the fuel tank 80, the second section 86 can be moved laterally or longitudinally (FIG. 12) and pivoted sideways (FIG. 13) and/or pivoted downwardly (FIG. 14).

By the exemplary embodiments described herein, fuel tanks, such as those having adjustable portions or growth zones or employing a telescoping relation between component parts, provide the ability to adjust the volume/shape of the fuel tank in any direction, allowing such a fuel tank to be used in several different types of vehicle widths, lengths, heights, etc. This gives a vehicle designer significant flexibility to tailor the volume and shape of the fuel tank to the vehicle underbody geometry. Such flexibility is desirable because the size and shape of the fuel tank sometimes dictates at least portions of the interior geometry, such as the shape of the floor, which can be a consideration for interior cabin usability. In addition, the adjustable fuel tanks described herein can advantageously reduce the risk of sunk investment cost/development time to a particular vehicle project, such as if the product is ultimately not a market success. Finally, consumers' expectations for a vehicle range can change over the vehicle's lifecycle. Accordingly, it is desirable for vehicle manufacturers to have the ability to alter fuel tank volume for purposes of matching customer expectations for driving range versus cost of a fill-up, particularly without significant investment cost or development time. Accordingly, the fuel tanks according to the exemplary embodiments described herein enable the vehicle structure and fuel system to be changed easily and relatively inexpensively. This provides flexibility, reduces investment risk, improves consumer satisfaction, etc.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. An adjustable fuel tank for a vehicle, comprising:
a container body defining a container volume and including a first container section and a second container section, the first and second container sections each having a fixed volume,
the first and second container sections movable relative to one another for adjusting at least one of an exterior shape of said container body and the container volume of the container body,
wherein said container body includes an adjustable portion interconnecting said first and second sections, said adjustable portion enabling relative movement between said first and second sections, and
wherein said second section is pivotable relative to said first section.

2. The adjustable fuel tank of claim 1 wherein said adjustable portion is an accordion pleated adjustable portion.

3. The adjustable fuel tank of claim 2 wherein said accordion pleated adjustable portion is expandable and collapsible to adjust said exterior shape of said container body and said container volume of said container body.

4. The adjustable fuel tank of claim 1 wherein said container body is mounted in the vehicle such that said first container section is positioned forward of said second container section relative to a longitudinal length of the vehicle, allowing said first container section to move forward relative to said second container section along said longitudinal length of the vehicle.

5. The adjustable fuel tank of claim 1 wherein said container body is mounted in the vehicle such that said first container section is positioned laterally adjacent to said second container section relative to a lateral width of the vehicle, allowing said first container section to move laterally with respect to said second container section along said lateral width of the vehicle.

6. The adjustable fuel tank of claim 1 wherein said container body is mounted in the vehicle such that said first container section is positioned below said second container section relative to a height of the vehicle, allowing said first container to move relative to said second section along said height of the vehicle.

7. The adjustable fuel tank of claim 1 wherein said second container section is movable in at least two directions relative to said first container section.

8. The adjustable fuel tank of claim 1, wherein said adjustable portion comprises a material that is relatively flexible compared to a material of said first and second container sections.

9. The adjustable fuel tank of claim 1, wherein said adjustable portion has a material wall thickness that is less than a material wall thickness of the first and second container sections.

10. A method of installing an adjustable fuel tank in a vehicle, comprising:
providing a fuel tank body having a first fuel tank section and a second fuel tank section, said first and second fuel tank sections movable relative to one another to vary an exterior shape of said fuel tank body and a container volume of said fuel tank body;
moving said second fuel tank section relative to said first fuel tank section to adjust said exterior shape of said fuel tank body and said container volume of said fuel tank body; and
installing said fuel tank body on the vehicle such that said first container section is positioned one of forward of said second container section relative to a longitudinal length of the vehicle allowing said first container section to move forward relative to said second container section along said longitudinal length of the vehicle, or laterally adjacent to said second container section relative to a lateral width of the vehicle allowing said first container section to move laterally with respect to said second container section along said lateral width of the vehicle.

11. The method of claim 10 wherein said fuel tank body includes a bellows portion and moving said second fuel tank section relative to said first fuel tank section includes expanding said bellows portion.

12. The method of claim 10 wherein said first and second fuel tank sections maintain a shape independent of an amount of fuel in said tank sections.

13. An adjustable fuel tank for a vehicle, comprising:
a container body defining a container volume and including a first container section and a second container section, the first and second container sections each having a fixed volume,
the first and second container sections movable relative to one another for adjusting at least one of an exterior shape of said container body and the container volume of the container body,
wherein said container body is mounted in the vehicle such that said first container section is positioned forward of said second container section relative to a longitudinal length of the vehicle, allowing said first container section to move forward relative to said second container section along said longitudinal length of the vehicle.

14. An adjustable fuel tank for a vehicle, comprising:
a container body defining a container volume and including a first container section and a second container section, the first and second container sections each having a fixed volume,
the first and second container sections movable relative to one another for adjusting at least one of an exterior shape of said container body and the container volume of the container body,
wherein said container body is mounted in the vehicle such that said first container section is positioned laterally adjacent to said second container section relative to a lateral width of the vehicle, allowing said first container section to move laterally with respect to said second container section along said lateral width of the vehicle.

* * * * *